(12) United States Patent
Bruestle

(10) Patent No.: US 10,309,448 B2
(45) Date of Patent: Jun. 4, 2019

(54) PIVOTING BEARING FOR TWO CONNECTING RODS IN AT LEAST ONE RECIPROCATING PISTON

(71) Applicant: Neander Motors AG, Kiel (DE)

(72) Inventor: Claus Bruestle, Nordheim (DE)

(73) Assignee: Neander Motors AG, Kiel (DE)

( * ) Notice: Subject to any disclaimer, the term of this patent is extended or adjusted under 35 U.S.C. 154(b) by 0 days.

(21) Appl. No.: 15/850,134

(22) Filed: Dec. 21, 2017

(65) Prior Publication Data

US 2018/0180089 A1    Jun. 28, 2018

(30) Foreign Application Priority Data

Dec. 22, 2016  (DE) .................... 10 2016 015 307 U

(51) Int. Cl.
*F02B 75/32* (2006.01)
*F16C 9/04* (2006.01)
(Continued)

(52) U.S. Cl.
CPC .................. *F16C 9/04* (2013.01); *F01B 1/10* (2013.01); *F02B 75/065* (2013.01); *F02B 75/32* (2013.01); *F16H 57/12* (2013.01); *F16J 1/14* (2013.01)

(58) Field of Classification Search
CPC .......... F02B 75/065; F02B 75/32; F16C 9/04; F16H 57/12; F16J 1/14; F01B 1/10
(Continued)

(56) References Cited

U.S. PATENT DOCUMENTS 5,873,333 A * 2/1999 Wittner ................. F02B 75/045
                                                123/197.3
6,209,496 B1 * 4/2001 Pelz ...................... F02B 75/065
                                                123/197.3
(Continued)

FOREIGN PATENT DOCUMENTS

EP        2 426 336 A2    3/2012

*Primary Examiner* — Marguerite J McMahon
(74) *Attorney, Agent, or Firm* — Crowell & Moring LLP

(57) ABSTRACT

A pivoting bearing is provided for two connecting rods in a reciprocating piston of an internal combustion engine having two crankshafts which are driven via the reciprocating piston and the connecting rods. The pivoting bearing is received by piston bores of the piston and has gudgeon pin bores for mounting gudgeon pins for gudgeon pin eyes of the connecting rods. The pivoting bearing has radial bearing regions which are provided with the pin bores, are arranged on both sides of a center longitudinal axis of the reciprocating pistons, and delimit the gudgeon pin eyes in a manner which forms an intermediate space. To optimize the pivoting bearing, the bearing regions of the pivoting bearing are configured as cylinder bodies with a cup-like cross section, of which each cylinder body has a base wall and a bearing ring shell. The base walls of the two cylinder bodies extend at a spacing from one another, and the bearing ring shells which surround the base walls are guided away from the base walls in opposite directions. A plurality of connecting stubs run between the base walls in such a way that two connecting stubs are arranged on a side of the pivoting bearing, which side faces a piston crown, and extend at a relatively small spacing from ring sections of the gudgeon pin eyes, and in such a way that the connecting stubs and the ring sections have lubricating structures for lubricating connecting rod bearings of the connecting rods.

12 Claims, 3 Drawing Sheets

(51) Int. Cl.
    *F02B 75/06*     (2006.01)
    *F01B 1/10*     (2006.01)
    *F16H 57/12*     (2006.01)
    *F16J 1/14*     (2006.01)

(58) Field of Classification Search
    USPC .......................................... 123/197.4, 193.6
    See application file for complete search history.

(56) References Cited

U.S. PATENT DOCUMENTS

| | | | |
|---|---|---|---|
| 6,447,268 B1 * | 9/2002 | Abramopaulos | F01C 1/32 |
| | | | 123/52.2 |
| 7,434,562 B2 * | 10/2008 | Ishimitsu | F02B 75/065 |
| | | | 123/197.2 |
| 2008/0257299 A1 * | 10/2008 | Ishimitsu | F02B 75/065 |
| | | | 123/197.4 |
| 2008/0264375 A1 * | 10/2008 | Hollinger | F01B 9/02 |
| | | | 123/193.6 |
| 2010/0077984 A1 | 4/2010 | Baindl et al. | |
| 2012/0055443 A1 | 3/2012 | Betzmeir et al. | |

\* cited by examiner

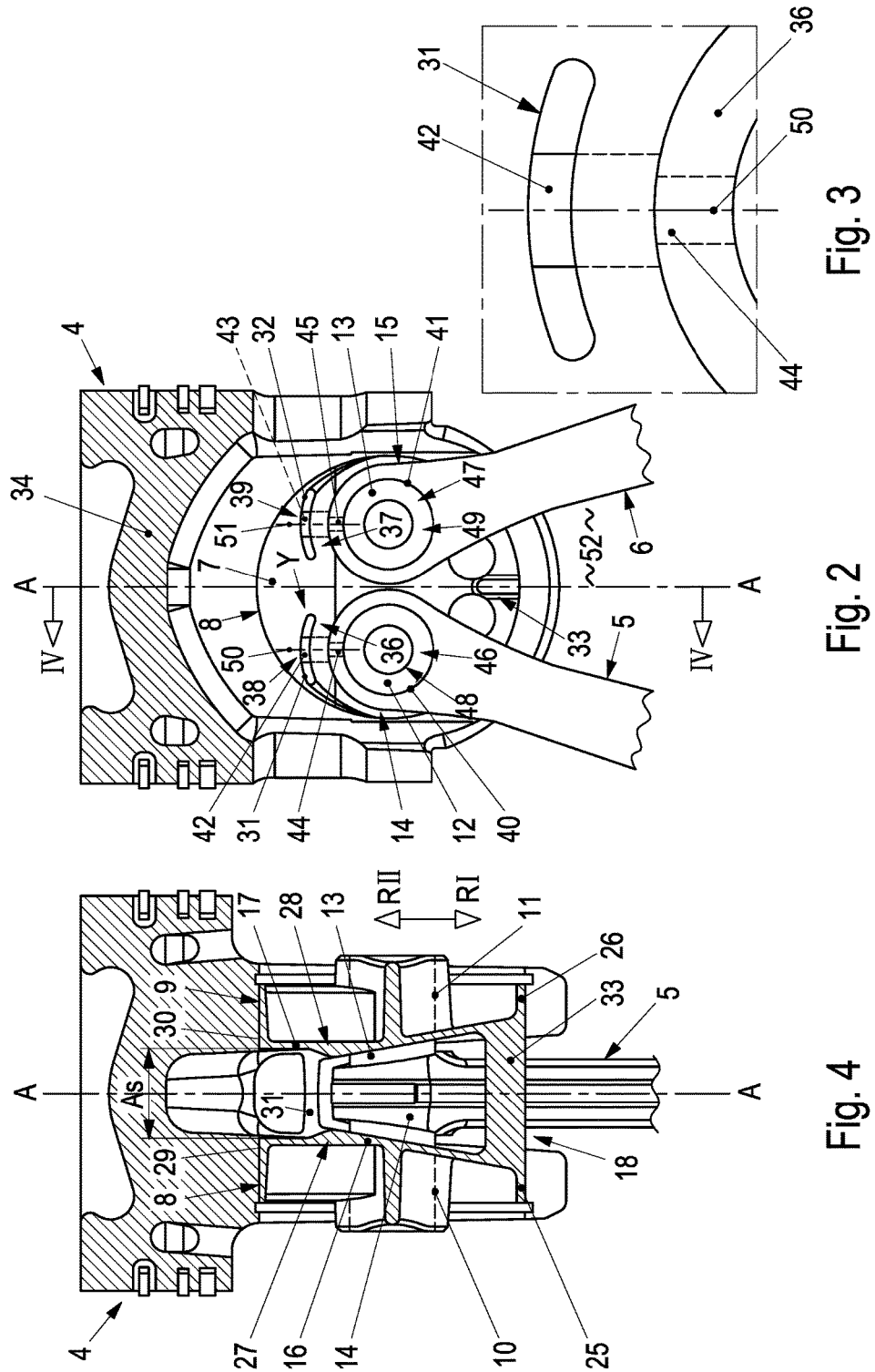

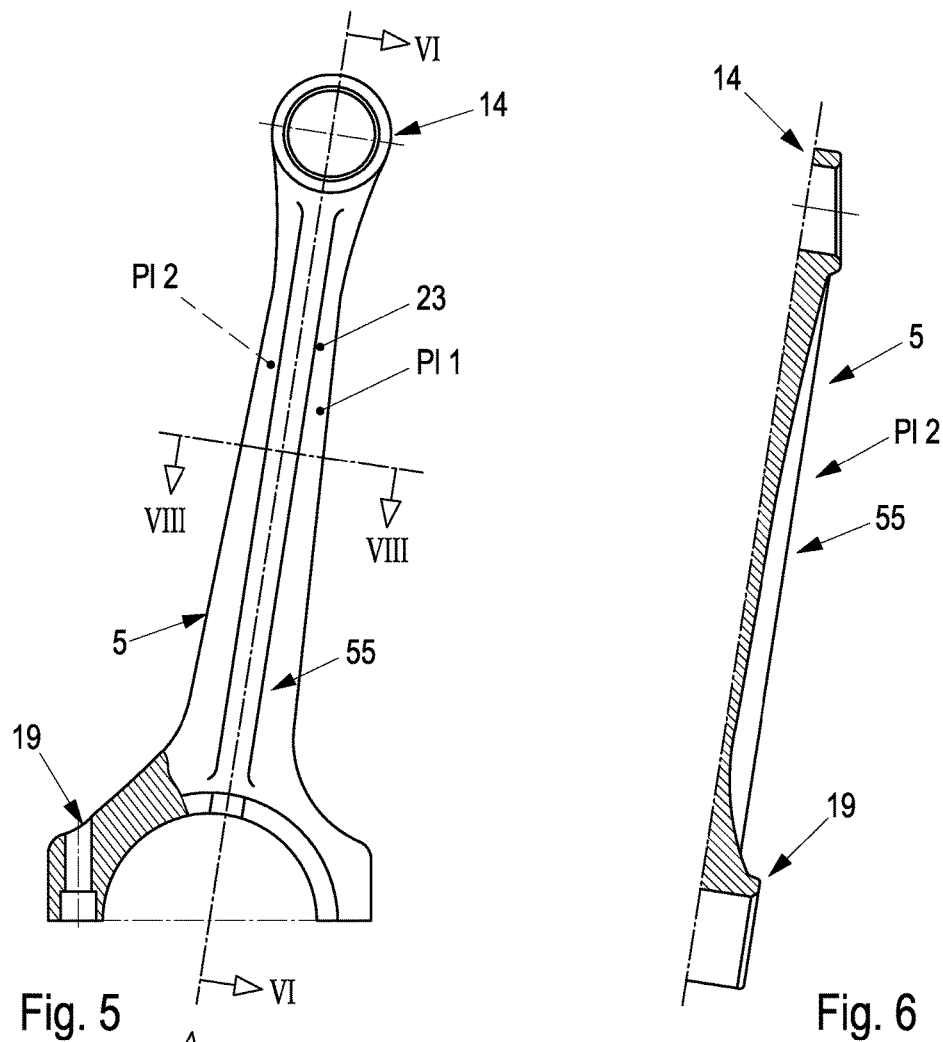
Fig. 5
Fig. 6
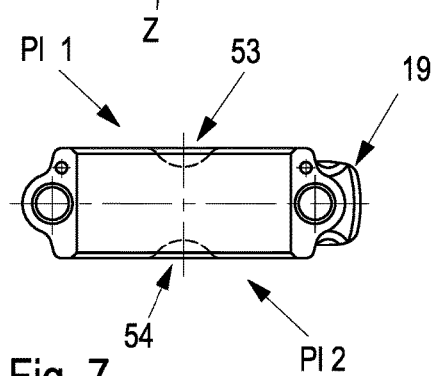
Fig. 7
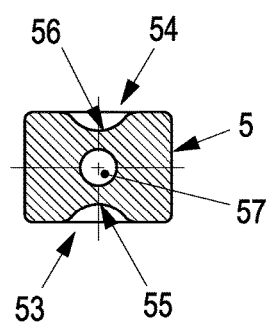
Fig. 8

PIVOTING BEARING FOR TWO CONNECTING RODS IN AT LEAST ONE RECIPROCATING PISTON

CROSS REFERENCE TO RELATED APPLICATIONS

This application claims priority under 35 U.S.C. § 119 from German Patent Application No. DE 10 2016 015 307.5, filed Dec. 22, 2016, the entire disclosure of which is herein expressly incorporated by reference.

BACKGROUND AND SUMMARY OF THE INVENTION

The invention relates to a pivoting bearing for two connecting rods in at least one reciprocating piston of an internal combustion engine having two crankshafts which are driven via the reciprocating piston and the connecting rods.

An internal combustion engine is known (US 2010/0077984 A1), in which two parallel crankshafts are driven by means of a reciprocating piston and using two connecting rods. The connecting rods are connected to bearing sections of the pistons in an articulated manner via connecting rod eyes and gudgeon pins.

A similar internal combustion engine is apparent from EP 2 426 336 A2. However, the connecting rod eyes are attached on pivoting bearings such that they can be moved pivotably via gudgeon pins. Said pivoting bearings are mounted in bores of the reciprocating piston such that they can be rotated relative to the latter.

It is an object of the invention to design a pivoting bearing in a piston for connecting rod eyes of connecting rods, which pivoting bearing is distinguished by a functional construction. It should also be ensured here, however, that bearing points of the pivoting bearing, above all between connecting rod eyes and connecting rod eye pins, are supplied satisfactorily with lubricant.

According to the invention, said object is achieved by a pivoting bearing for two connecting rods in at least one reciprocating piston of an internal combustion engine having two crankshafts which are driven via the reciprocating piston and the connecting rods, the pivoting bearing being received by piston bores of the piston and having pin bores for mounting gudgeon pins for gudgeon pin eyes of the connecting rods. The pivoting bearing has radial bearing regions which are provided with the pin bores, are arranged on both sides of a center longitudinal axis of the reciprocating piston, and delimit the gudgeon pin eyes in a manner which forms an intermediate space. The bearing regions of the pivoting bearing are configured as cylinder bodies with a cup-like cross section, of which each cylinder body has a base wall and a bearing ring shell. The base walls of the two cylinder bodies extend at a spacing from one another, and the bearing ring shells which surround the base walls are guided away from the base walls in opposite directions. A plurality of connecting stubs run between the base walls in such a way that two connecting stubs are arranged on a side of the pivoting bearing, which side faces a piston crown, and extend at a relatively small spacing from ring sections of the gudgeon pin eyes, and in such a way that, moreover, the connecting stubs and the ring sections have measures for lubricating connecting rod bearings of the connecting rods.

The advantages which are mainly achieved by way of the invention can be seen in that the bearing regions of the pivoting bearings are configured as cylinder bodies with a cup-like cross section, of which each cylinder body has a base wall and a bearing ring shell, which base walls of the two cylinder bodies extend at a spacing from one another, the bearing ring shells which surround the base walls being guided away from the base walls in opposite directions, and a plurality of connecting stubs running between the base walls in such a way that two connecting stubs are arranged on a side of the pivoting bearing, which side faces a piston crown, and extend at a relatively small spacing from ring sections of the connecting rod eyes, and in such a way that, moreover, the connecting stubs and the ring sections have measures for lubricating the connecting rod bearings.

The successful and easily realizable construction and the measures for lubricating the connecting rod bearings are to be highlighted in the pivoting bearing. The fact that firstly the connecting stubs are of annular configuration and are adapted to the shape profile of the ring sections of the gudgeon pin eyes, and secondly that through openings, which face one another in the connecting stubs and the ring sections for the access of lubricant of the lubrication, are arranged in bearing points between the pin bores of the connecting rods and the gudgeon pins, achieve the advantages in an exemplary manner.

It is exemplary firstly that the through openings have an oval shape in the connecting stubs and a circular shape in the ring sections, and that secondly the through openings of the connecting stubs and the ring sections have common center longitudinal planes. It is of technically high importance that the lubricant of the lubrication firstly passes by way of roving particles of aerosol-containing gases in a crankcase of the internal combustion engine and secondly by way of devices of the crankshafts and the connecting rods into the intermediate space and/or to the through openings. It is ingenious that the devices are formed firstly by way of recesses which are arranged on opposite longitudinal sides of the crank pin eyes and secondly by way of guiding apparatuses which extend between the crank pin eyes and the gudgeon pin eyes, via which guiding apparatuses lubricants of the lubrication are moved into the intermediate space and/or the through openings. In a simple way, said devices can be formed by way of longitudinal grooves on the longitudinal sides of the connecting rod shanks of the connecting rods, which longitudinal grooves extend between the crank pin eyes and the gudgeon pin eyes. Finally, however, there is also the possibility that the devices are formed by way of longitudinal bores in the connecting rod shanks of the connecting rods between the crank pin eyes and the gudgeon pin eyes.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 2 shows a detail W from FIG. 1 on a larger scale.

FIG. 3 shows a detail Y from FIG. 2 on a larger scale.

FIG. 4 shows a section approximately according to the line IV-IV from FIG. 2.

FIG. 5 approximately shows a detail Y from FIG. 1 on a larger scale.

FIG. 6 shows a part section according to the line VI-VI from FIG. 5.

FIG. 7 shows a view in the arrow direction Z from FIG. 5.

FIG. 8 shows a section approximately according to the line VIII-VIII from FIG. 5.

DETAILED DESCRIPTION OF THE DRAWINGS

Figure 1:
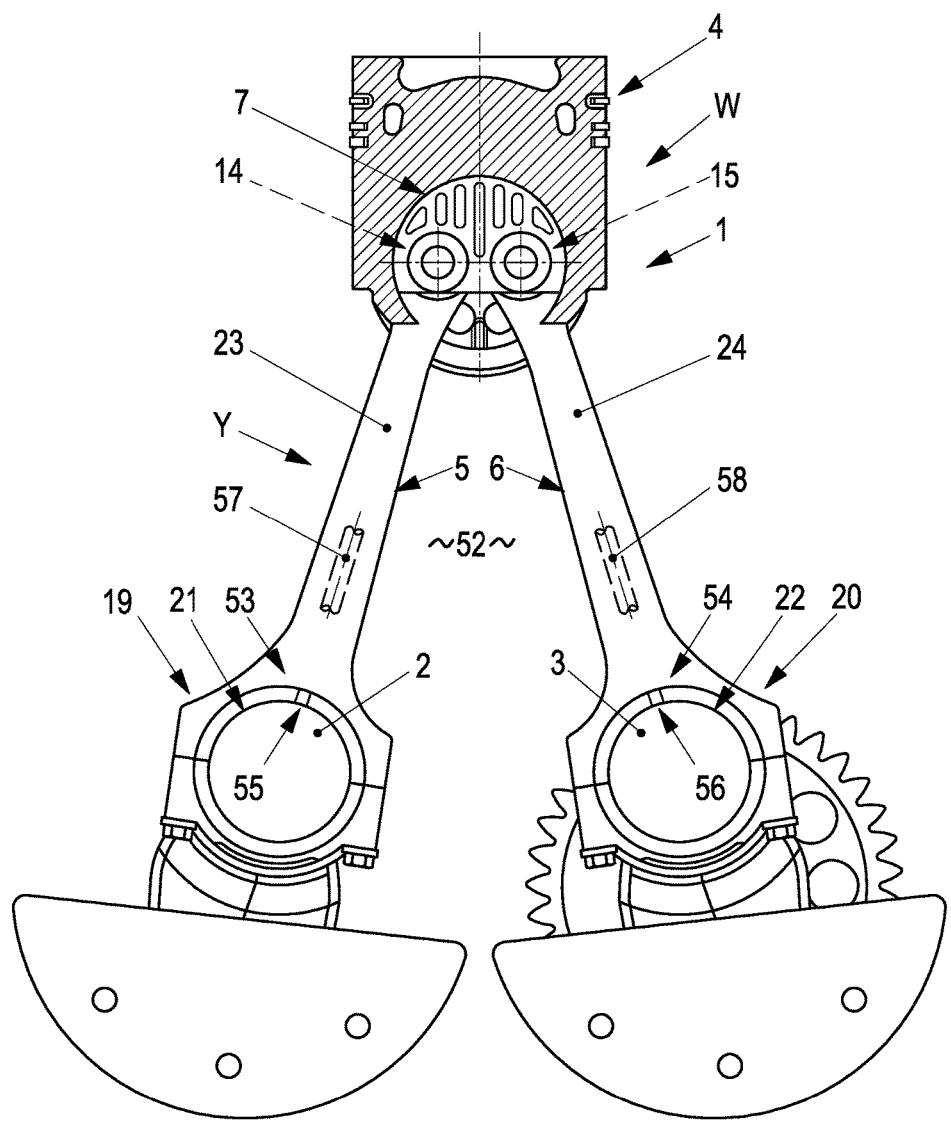
FIG. 1 is a diagrammatic part cross section of an internal combustion engine of reciprocating piston design having a reciprocating piston and a pivoting bearing which is mounted therein such that it can be rotated relative to it.

An internal combustion engine 1 of reciprocating piston design has two parallel crankshafts 2, 3 which are driven via at least one reciprocating piston 4 and two connecting rods 5, 6. The connecting rods 5, 6 are connected in a rotationally movable manner to a pivoting bearing 7 which is received by piston bores 8, 9 of the reciprocating piston 4. The pivoting bearing 7 has pin bores 10, 11 for mounting gudgeon pins 12, 13 of gudgeon pin eyes 14, 15, and it comprises radial bearing regions 16, 17 which are arranged on both sides of a center longitudinal axis A-A of the reciprocating piston 4 and delimit the gudgeon pin eyes 14, 15 in a manner which forms an intermediate space 18 (FIGS. 2 and 4). On the sides which face away from the gudgeon pin eyes 14, 15, the connecting rods 5, 6 are provided with crank pin eyes 19, 20 which are coupled to crank pins 21, 22 of the crankshafts 2, 3. Connecting rod shanks 23, 24 (FIG. 1) extend between the gudgeon pin eyes 14, 15 and the crank pin eyes 19, 20 of the connecting rods 5, 6. According to FIG. 4, the gudgeon pin eyes 14, 15 have a trapezoidal shape with oblique side faces. Due to this design, the connecting rod weight can be lowered and the strength of the pivoting bearing 7 can be optimized.

The internal combustion engine 1 operates using the diesel process with direct injection, and it is provided with an exhaust gas turbocharger device. A similar internal combustion engine is apparent from DE 10 2011 104 496 B4.

The bearing regions 16, 17 of the pivoting bearing 7 are configured as cylinder bodies 25, 26 with a cup-like cross section Qs, and said cylinder bodies 25, 26 in each case have a base wall 27, 28 and a bearing ring shell 29, 30. The base walls 27, 28 of the two cylinder bodies run at a spacing As from one another (FIG. 4). Here, the bearing ring shells 29, 30 which surround the base walls 27, 28 are guided away from the base walls 27, 28 in opposite directions RI and RII. Connecting stubs 31, 32 and 33 are active between the base walls 27, 28 (FIGS. 2 and 4). Of these, two connecting stubs 31, 32 are arranged on a side 35 of the pivoting bearing 7, which side 35 faces a piston crown 34, to be precise in a manner which is spaced apart from the center longitudinal axis A-A. The third connecting stub 33 runs in the center longitudinal axis A-A at a distance from the connecting stubs 31, 32. Moreover, the connecting stubs 31, 32 extend at a relatively small spacing from ring sections 36, 37 of the gudgeon pin eyes 14, 15. In addition, the connecting stubs 31, 32 and the ring sections 36, 37 have lubricating structures 38, 39 for lubricating connecting rod bearings 40, 41 of the connecting rods 5, 6 (FIG. 2).

As viewed in cross section, the connecting stubs 31, 32 are of annular configuration and are adapted to the shape profile of the ring sections 36, 37 of the gudgeon pin eyes 14, 15 (FIG. 2). The lubricating structures 38, 39 are provided as through openings 42, 43 and 44, 45, which face one another, in the connecting stubs 31, 32 and the ring sections 36, 37, and bring about the entry of lubricants of the lubrication Schm into bearing points 46, 47 of gudgeon pin bearings 48, 49, to be precise between the pin bores 10, 11 of the connecting rods 5, 6 and the gudgeon pins 12, 13 (FIGS. 2 and 3). The through openings 42, 43 have an oval shape in the connecting stubs 31, 32 and a circular shape in the ring sections 36, 37. Here, the through openings 42, 43 and 44, 45 of the connecting stubs 31, 32 and the ring sections 36, 37 have common radial center longitudinal planes 50, 51.

Lubricants of the lubrication pass firstly by way of roving particles of aerosol-containing gases in a crankcase 52 of the internal combustion engine 1 and secondly by way of devices 53, 54 of the crankshafts 2, 3 and the connecting rods 5, 6 into the intermediate space 18 and/or to the through openings 42, 43 and 44, 45. The devices 53, 54 are formed firstly by way of recesses 55, 56 which are arranged on opposite outer sides Pl1 and Pl2 (FIG. 7) of the crank pin eyes 19, 20, and secondly by guiding apparatuses 57, 58 which extend between the crank pin eyes 19, 20 and the gudgeon pin eyes 14, 15 in the connecting rod shanks 23, 24, via which guiding apparatuses 57, 58 lubricants of the lubrication pass into the intermediate space 18 and/or the through openings 42, 43 and 44, 45. The devices 53, 54 of the connecting rods 5, 6 are configured as longitudinal grooves 55, 56 on outer sides of the connecting rod shanks 23, 24, to be precise in such a way that said longitudinal grooves 55, 56 run between the crank pin eyes 19, 20 and the gudgeon pin eyes 14, 15 (FIGS. 5 and 8). Finally, it is also contemplated to provide the devices 53, 54 as longitudinal bores 57, 58 (FIGS. 1 and 8) in the connecting rod shanks 23, 24 between the crank pin bores 19, 20 and the gudgeon pin eyes 14, 15.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A pivoting bearing in a reciprocating piston of an internal combustion engine having two crankshafts driven via the reciprocating piston, the pivoting bearing comprising:
  two connecting rods by which the two crankshafts are respectively driven via the reciprocating piston, wherein
  the pivoting bearing is received by piston bores of the piston and has pin bores for mounting gudgeon pins for gudgeon pin eyes of the connecting rods,
  the pivoting bearing has radial bearing regions which are provided with the pin bores, are arranged on both sides of a center longitudinal axis of the reciprocating piston, and delimit the gudgeon pin eyes in a manner forming an intermediate space,
  the bearing regions of the pivoting bearing are configured as cylinder bodies with a cup-shape cross section, of which each cylinder body has a base wall and a bearing ring shell,
  the base walls of the two cylinder bodies extend at a spacing from one another,
  the bearing ring shells which surround the base walls are guided away from the base walls in opposite directions,
  a plurality of connecting stubs run between the base walls such that two connecting stubs are arranged on a side of the pivoting bearing that faces a piston crown and extend at a relatively small spacing from ring sections of the gudgeon pin eyes, and
  lubricating structures are provided in the connecting stubs and the ring sections for lubricating connecting rod bearings of the connecting rods.

2. The pivoting bearing as claimed in claim 1, wherein two connecting stubs are of annular configuration and are adapted to a shape profile of the ring sections of the gudgeon pin eyes.

3. The pivoting bearing as claimed in claim 2, wherein through openings which face one another in the two connecting stubs and the ring sections for the entry of lubricant are arranged in bearing points between the pin bores and the gudgeon pins.

4. The pivoting bearing as claimed in claim 3, wherein the through openings have an oval shape in the two connecting stubs and a circular shape in the ring sections.

5. The pivoting bearing as claimed in claim 4, wherein the through openings of the connecting stubs and of the ring sections have common center longitudinal planes.

6. The pivoting bearing as claimed in claim 1, wherein lubricants of the lubrication pass firstly by way of roving particles of aerosol-containing gases in a crankcase of the internal combustion engine and secondly by devices of the crankshafts and the connecting rods into the intermediate space and/or to the through openings.

7. The pivoting bearing as claimed in claim 3, wherein lubricants of the lubrication pass firstly by way of roving particles of aerosol-containing gases in a crankcase of the internal combustion engine and secondly by devices of the crankshafts and the connecting rods into the intermediate space and/or to the through openings.

8. The pivoting bearing as claimed in claim 5, wherein lubricants of the lubrication pass firstly by way of roving particles of aerosol-containing gases in a crankcase of the internal combustion engine and secondly by devices of the crankshafts and the connecting rods into the intermediate space and/or to the through openings.

9. The pivoting bearing as claimed in claim 6, wherein the devices comprise firstly recesses which are arranged on opposite outer sides of the crank pin eyes, and secondly guiding apparatuses which extend between the crank pin eyes and the connecting rod eyes, via which guiding apparatuses lubricants are moved into the intermediate space and/or the through openings.

10. The pivoting bearing as claimed in claim 9, wherein the recesses are longitudinal grooves formed on opposite longitudinal sides of connecting rod shanks of the connecting rods, which longitudinal grooves extend between the crank pin eyes and the gudgeon pin eyes.

11. The pivoting bearing as claimed in claim 10, wherein the devices are configured by way of longitudinal bores in the connecting rod shanks of the connecting rods between crank pin eyes and the gudgeon pin eyes.

12. The pivoting bearing as claimed in claim 9, wherein the devices are configured by way of longitudinal bores in the connecting rod shanks of the connecting rods between crank pin eyes and the gudgeon pin eyes.

* * * * *